(12) United States Patent
Nikaido et al.

(10) Patent No.: US 6,396,563 B2
(45) Date of Patent: May 28, 2002

(54) EXPOSURE APPARATUS

(75) Inventors: Masaru Nikaido, Yokosuka; Tomoaki Ishino, Kamagaya; Tetsuya Tadokoro, Ichikawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/758,191

(22) Filed: Jan. 12, 2001

(30) Foreign Application Priority Data

Jan. 14, 2000 (JP) ........................................ 2000-006947

(51) Int. Cl.⁷ ...................... G03B 237/52; G03B 27/32; G03B 27/54; G03B 15/00; G03F 9/00
(52) U.S. Cl. ............................. 355/30; 355/24; 355/53; 355/70; 355/72; 399/364; 430/5; 430/311
(58) Field of Search ............................. 355/24, 30, 53, 355/70, 72; 399/364; 430/5, 311

(56) References Cited

U.S. PATENT DOCUMENTS

| | | | |
|---|---|---|---|
| 4,721,980 A | * | 1/1988 | Yazaki .......................... 355/26 |
| 5,083,156 A | * | 1/1992 | Sato et al. ..................... 355/91 |
| 5,973,764 A | * | 10/1999 | McCullough et al. ......... 355/30 |

FOREIGN PATENT DOCUMENTS

JP        8-124822        5/1996

\* cited by examiner

*Primary Examiner*—Russell Adams
*Assistant Examiner*—Khaled Brown
(74) *Attorney, Agent, or Firm*—Oblon, Spivak, McClelland, Maier & Neustadt, P.C.

(57) ABSTRACT

An exposure apparatus comprises mask support portions, which support photo masks each having an exposure pattern thereon for movement between an exposure position in which the masks are in contact with a to-be-exposed object and a separate position in which the masks are kept off the object. Exposure light sources are used to expose the to-be-exposed object through the photo masks that are located in the exposure position. A clean air supplier runs clean air from a first supply portion into regions between the to-be-exposed object and the photo masks to prevent penetration of foreign substances when the photo masks are moved to the separate position. When the photo masks are moved to the exposure position, the supplier feeds clean air from a second supply portion onto the respective outer surfaces of the photo masks, thereby cooling the photo masks.

13 Claims, 2 Drawing Sheets

EXPOSURE APPARATUS

CROSS-REFERENCE TO RELATED APPLICATIONS

This application is based upon and claims the benefit of priority from the prior Japanese Patent Application No. 2000-006947, filed Jan. 14, 2000, the entire contents of which are incorporated herein by reference.

BACKGROUND OF THE INVENTION

The present invention relates to an exposure apparatus for exposing a to-be-exposed object by using a photo mask.

In general, a color cathode-ray tube, for example, comprises a vacuum envelope with a panel having phosphor screen on its inner surface and a shadow mask that is opposed to the phosphor screen in the envelope. A large number of electron beam passage apertures are formed in the effective surface of the shadow mask. Electron beams emitted from an electron gun are applied to the phosphor screen through the electron beam passage apertures. The shadow mask, which is called a color selecting electrode, has a color selecting function such that the electron beams can be run against only those phosphor layers which are geometrically in one-to-one relation with the apertures.

Normally, a shadow mask is formed of a metallic sheet with a thickness of about 0.1 to 0.25 mm. such as aluminum-killed steel or low-thermal-expansion invar material (Fe-36% Ni), which is bored with tens of thousands to hundreds of thousands of infinitesimal circular or rectangular electron beam apertures. Each aperture is formed of a larger hole that opens in the screen-side surface of the shadow mask and a smaller hole that opens in the gun-side surface of the mask, the two holes communicating with each other.

Conventionally, the shadow mask of this type is manufactured by the photo-etching method using a first matrix corresponding to the larger holes and a second matrix corresponding to the smaller holes, as photo masks. The following is a description of the shadow mask manufacturing method.

After both surfaces of a thin metallic belt (shadow mask material), such as aluminum-killed steel or invar material, are first degreased and rinsed to remove rust resisting oil and soil thereon, a water-soluble resist, selected among resist materials based on casein-dichromates, PVA-dichromates, etc., is applied to the surfaces and dried.

After a pair of photo masks each having a given exposure pattern are then brought into vacuum contact with the opposite resist-coated surfaces of the thin metallic belt, individually, they are exposed through the photo masks. Subsequently, the exposed resist is developed, flushed, dried, and baked to form an etching pattern. In this state, the thin metallic belt is etched to form the electron beam passage apertures. Generally, the metallic belt is etched twice for its obverse and reverse sides if its apertures are circular which are mainly used in a shadow mask for displays. If the apertures are rectangular which are mainly used in a shadow mask for television sets, the metallic belt is etched at a time from both sides. Thereafter, the resist is separated. In the case where the metallic belt is etched twice for the opposite sides, the resist and a back coat that is applied after the reverse side is etched are separated, and finally, each shadow mask is cut off and completed.

In general, each photo mask used in an exposure process for a shadow mask is an emulsion mask that is obtained by applying an emulsion layer, which is formed of a gelatin film having a silver-nitrate-based sensitizer dispersed therein, to one surface of a green glass base, and forming on the emulsion layer a given exposure pattern that corresponds to apertures of the shadow mask.

In an exposure apparatus for shadow mask, the pair of photo masks formed in the aforethe manner are attached individually to vacuum-contact frames so that the exposure pattern surfaces or the emulsion layers face inward, and are opposed to each other with the thin metallic belt, having the resist formed on either surface thereof, between them. After the relative positions of the photo masks are aligned with high accuracy, the photo masks are brought individually into vacuum contact with the opposite surfaces of the metallic belt by means of the vacuum-contact frames. In this state, the resist is exposed through the photo masks by means of exposure means.

After exposure is finished, the vacuum contact is canceled so that the photo masks are separated from the thin metallic belt, and exposed portions of the belt are driven out of the vacuum-contact frames, whereupon one cycle of exposure operation terminates. Normally, a series of cycles of such operation is carried out continuously. In some cases, a large number of vacuum-contact frames and photo masks may be arranged so that a plurality of parts of the metallic belt can be exposed at a time.

However, the following problems will be aroused if resist layers on the opposite surfaces of the thin metallic belt are exposed to exposure patterns for the pair of photo masks by the aforethe method. Emulsion masks are low-priced and can be easily used as shadow masks or large-sized PDP masks. Since the gelatin film is used for the emulsion layers, however, the emulsion masks are low in film hardness and film strength and flaw easily. If foreign substances are sandwiched between these masks, therefore, they sink into the emulsion layers and become unremovable.

In the shadow mask exposure process, as described above, so-called hard-contact exposure is effected such that the resist layers and the emulsion layers are pressed hard against one another as the shadow mask is exposed. If foreign substances, such as slugs, dust, etc., are interposed between the resist layers and the emulsion layers, therefore, the emulsion layers, which are low in film hardness and film strength, may be marred, the exposure patterns may be partially broken off, or the foreign substances may remain sinking in the emulsion layers. This may result in formation of defective apertures in an exposure region, development of stains thereon, partial breakage of the exposure patterns, or formation of unnecessary opaque portions in the photo masks.

Once the emulsion masks are damaged in this manner, moreover, they can never recover afterward. If the damage is not noticed, therefore, all of shadow masks that are to be manufactured in the subsequent processes are subject to common failure in the same regions, so that the yield is lowered substantially. Once the thin metallic belt is etched, in particular, it can never recover any more, thus suffering great damage.

Shadow masks of color cathode-ray tubes that are used as displays of personal computers or various monitors, for example, require high-accuracy electron beam passage apertures with diameters of 0.10 to 0.15 mm, array pitches of 0.2 to 0.3 mm, and diameter accuracy within the range of $\pm 3\ \mu m$. If the emulsion masks suffer adhesion of foreign substances of sizes that arouse no problems in the manufacture of shadow masks of color cathode-ray tubes for ordinary TV sets, therefore, they are greatly influenced by the substances and rendered defective.

According to an exposure apparatus described in Jpn. Pat. Appln. KOKAI Publication No. 8-124822, for example, a glass plate is opposed to a photo mask, and ionized gas is run into a space between them, whereby the photo mask is prevented from being charged and from collecting dust. However, this exposure apparatus is not provided with any measure to counter penetration or adhesion of foreign substances between the glass plate and a to-be-exposed object and between the photo mask and the object. Accordingly, this apparatus is not adapted for the aforethe hard-contact exposure.

BRIEF SUMMARY OF THE INVENTION

The present invention has been contrived in consideration of these circumstances, and its object is to provide an exposure apparatus capable of preventing penetration of foreign substances between a to-be-exposed object and photo masks so that the incidence of failure that is attributable to damage to the photo masks can be lowered to facilitate high-yield exposure.

In order to achieve the above object, an exposure apparatus according to the present invention comprises a mask support portion opposed to a to-be-exposed object, supporting a photo mask having an exposure pattern thereon, and configured to move the photo mask between an exposure position in which the photo mask is in contact with the to-be-exposed object and a separate position in which the photo mask is kept off the object; an exposure light source arranged to expose the to-be-exposed object through the photo mask in the exposure position; and a clean air supplier configured to run clean air between the to-be-exposed object and the photo mask when the photo mask is moved to the separate position.

According to this exposure apparatus, the clean air is supplied from the clean air supplier at least to the region between the to-be-exposed object and the photo mask in the separate position. By doing this, foreign substances can be prevented from adhering to the to-be-exposed object or the photo mask during an exposure process, and foreign substances that adhere to the object can be removed. Thus, foreign substances can be prevented from penetrating or jamming into the region between the to-be-exposed object and the photo mask, and the incidence of failure that is attributable to damage to the photo mask can be lowered.

Further, the clean air supplier includes a first supply portion configured to supply the clean air to the region between the to-be-exposed object and the photo mask when the photo mask is moved to the separate position and a second supply portion configured to supply the clean air to the outer surface of the photo mask when the photo mask is moved to the separate position and when the photo mask is moved to the exposure position. When the to-be-exposed object and the photo mask are in contact with each other, the clean air is supplied from the second supply portion only. When the object and the photo mask are separate, the clean air is supplied from both the first and second supply portions. The first supply portion serves to adjust the supply of the clean air depending on the movement of the photo mask.

As described above, the clean air from the second supply portion is supplied along the outer surface of the photo mask when the to-be-exposed object and the photo mask is in contact with each other, that is, during exposure. By doing this, the photo mask that is heated by heat rays from the exposure light source during exposure can be cooled, so that dislocation that is attributable to thermal expansion of the photo mask can be reduced to facilitate high-accuracy exposure. In this case, a satisfactory cooling effect can be obtained if the wind speed of the clean air that flows over the outer surface of the photo mask that is in contact with the to-be-exposed object is at 4.7 m/sec or more. Further, a satisfactory dust removing effect can be obtained if the wind speed of the clean air that flows between the to-be-exposed object and the photo mask that are separate from each other is at 2.7 m/sec or more.

Foreign substances can be prevented from adhering to the to-be-exposed object or the photo mask during the exposure process by ionizing the clean air alternately for positive and negative charges by means of ionization means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An exposure apparatus for shadow mask according to an embodiment of the present invention will now be described in detail with reference to the accompanying drawings.

Figure 2:
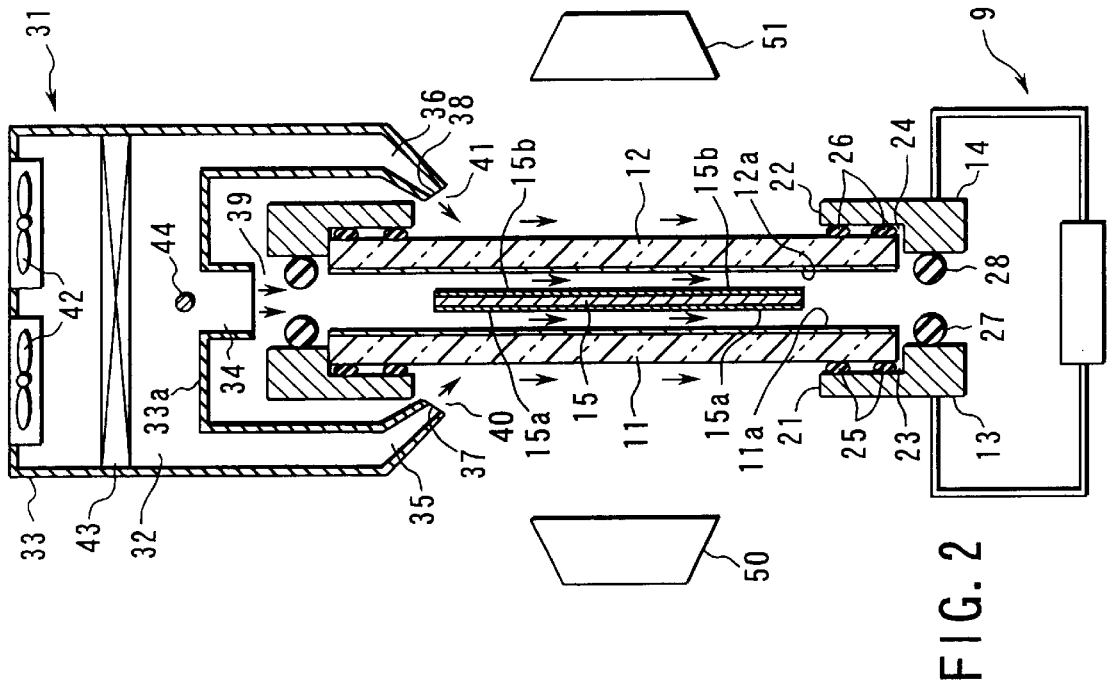
FIG. 2 is a longitudinal sectional view of the exposure apparatus, illustrating an operating state of the apparatus with opened photo masks.
Figure 1:
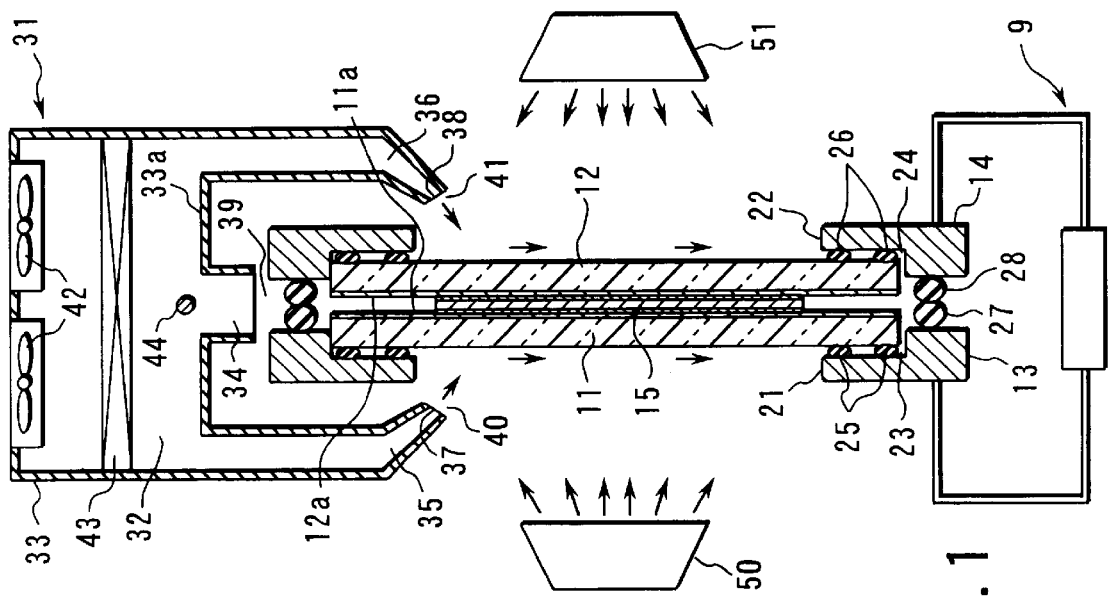
FIG. 1 is a longitudinal sectional view of an exposure apparatus according to a first embodiment of the present invention, illustrating an operating state of the apparatus for exposure.

As shown in FIGS. 1 and 2, the exposure apparatus of the present embodiment uses a thin metallic belt 15, a shadow mask material, as a to-be-exposed object. The apparatus exposes resist layers on the opposite surfaces of the metallic belt, thereby forming photo-resists for the formation of a large number of electron beam passage apertures in the belt by etching.

More specifically, the exposure apparatus comprises a pair of vacuum-contact frames 13 and 14 that face each other with the thin metallic belt 15 between them. The frames 13 and 14 support laminar photo masks 11 and 12, respectively, which are opposed parallel to the opposite surfaces of the metallic belt 15, individually. The metallic belt 15 is kept substantially upright and extends horizontally, and the photo masks 11 and 12 are also kept substantially upright.

The photo masks 11 and 12 are emulsion masks that are obtained by, for example, applying emulsion layers 11a and 12a, which are formed individually of gelatin films having a silver-nitrate-based sensitizer dispersed therein, to one surface (inner surface) of a green glass base, and forming on the emulsion layers a given exposure pattern that corresponds to apertures of a shadow mask.

The vacuum-contact frames 13 and 14 are rectangular frames that have openings 21 and 22, respectively, in the center. The respective inner peripheral portions of the opposed inner surfaces of the frames 13 and 14 are formed having step portions 23 and 24 on which the peripheral edge portions of the photo masks 11 and 12 rest, respectively. Two pairs of ring-shaped gaskets 25 and 26 in vacuum contact with outer peripheral edge portions of the photo masks 11 and 12 are arranged on the step portions 23 and 24, respectively. Further, ring-shaped gaskets 27 and 28 are fixed to the respective outer peripheral portions of the opposed inner surfaces of the frames 13 and 14. When the vacuum-contact frames 13 and 14 are moved to their respective contact positions, as mentioned later, the gaskets 27 and 28 come into vacuum contact with each other, thereby serving as means for hermetically closing a space between the photo masks 11 and 12.

The pair of photo masks 11 and 12 are attached to their corresponding vacuum-contact frames 13 and 14 so that the exposure pattern surfaces or the emulsion layers 11a and 12a on their respective inner surfaces are opposed to the thin metallic belt 15. The frames 13 and 14 can be moved toward and away from the metallic belt 15 by means of a drive mechanism 9. Thus, the photo masks 11 and 12 can be moved between an exposure position shown in FIG. 1 in which their emulsion layers 11a and 12a are intimately in contact with the opposite surfaces of the metallic belt 15 and a separate position shown in FIG. 2 in which the emulsion layers are separated from the belt surfaces. Even if the metallic belt 15 and the photo masks 11 and 12 are physically separated, they may be deemed to be in contact with one another provided that they are optically in line with one another.

The thin metallic belt 15 is formed in the following manner. After both surfaces of the shadow mask material, e.g., aluminum-killed steel or invar material, are degreased and rinsed to remove rust resisting oil and soil thereon, a water-soluble resist, selected among resist materials based on casein-dichromates, PVA-dichromates, etc., is applied to the surfaces and dried. Thus, resist layers 15a and 15b are formed individually on the opposite surfaces of the metallic belt 15.

The vacuum-contact frames 13 and 14 are overlain by a clean air supplier 31 that supplies clean air. The supplier 31 is provided with a hollow body 33 that has a blast space 32 therein. The body 33 has a lower wall portion 33a that is opposed to the respective upper end portions of the vacuum-contact frames 13 and 14.

A first discharge port 34 is formed in the central portion of the lower wall portion 33a so as to face the region between the vacuum-contact frames 13 and 14. Nozzles 35 and 36 extend downward from the opposite side portions of the lower wall portion 33a, individually. Second and third discharge ports 37 and 38 are formed in the distal ends the nozzles 35 and 36, respectively. They are directed toward the respective outer surfaces of their corresponding photo masks 11 and 12. The first discharge port 34 serves as a first supply portion 39 that supplies clean air to the region between the photo masks 11 and 12, while the second and third discharge ports 37 and 38 serve, respectively, as second supply portions 40 and 41 that supply the clean air along the respective outer surfaces of the photo masks 11 and 12.

An air inlet is formed in the upper part of the body 33. It is provided with fans 42 that introduce gas in the atmosphere into the blast space 32 in the body 33, thereby creating gas currents. Further, a filter 43 is located on the lower-stream side of the fans 42. It seizes dust and the like in the gas introduced by means of the fans 42, thereby purifying the gas to produce clean air. Located on the lower-stream side of the filter 43, moreover, is an alternating ionizer 44 for ionizing the clean air positively and negatively.

Furthermore, the exposure apparatus comprises a pair of exposure light sources 50 and 51, which are located outside the photo masks 11 and 12 and face the respective outer surfaces of their corresponding photo masks. The light sources 50 and 51 are formed of high-pressure mercury lamps or metal halide lamps, for example.

In exposing the resist layers 15a and 15b of the metallic belt 15 by means of the exposure apparatus constructed in this manner, the vacuum-contact frames 13 and 14 are closed by means of the drive mechanism 9 to move the photo masks 11 and 12 to the exposure position with the fans 42 of the clean air supplier 31 actuated, as shown in FIG. 1. By doing this, the emulsion layers 11a and 12a of the photo masks 11 and 12 are brought individually into vacuum contact with the opposite surfaces of the metallic belt 15.

As this is done, the gaskets 27 and 28 of the vacuum-contact frames 13 and 14 are brought intimately into contact with each other to close the space between the frames 13 and 14. The frames 13 and 14 face the first discharge port 34 of the clean air supplier 31. Although the supplier 31 is actuated, therefore, the clean air is restrained from being discharged from the first discharge port 34 by means of the closed frames 13 and 14. Thus, the ionized clean air is blown off mainly from the nozzles 35 and 36 toward the respective outer surfaces of the photo masks 11 and 12 through the second and third discharge ports 37 and 38 during exposure. The clean air flows along the outer surfaces of the photo masks 11 and 12, thereby forming clean curtains and cooling the photo masks 11 and 12.

During exposure, the photo masks 11 and 12 receive necessary ultraviolet rays for exposure and concurrent heat rays (infrared components) from the exposure light sources 50 and 51, e.g., high-pressure mercury lamps or metal halide lamps, so that their temperature increases. As the clean air flows along the respective outer surfaces of the photo masks 11 and 12 to release heat from them, however, the temperature of the masks 11 and 12 can be prevented from increasing.

A satisfactory cooling effect and clean function can be obtained by setting the respective angles of the distal end portions of the nozzles 35 and 36 and the second and third discharge ports 37 and 38 with respect to the photo masks 11 and 12 so that the Coanda effect is produced, that is, the clean air blown off from the nozzles 35, 36, and the second and third discharge ports 37, 38 is drawn to the outer surfaces of the photo masks 11 and 12, the decreasing in the flow rate is low, and the reaching distance becomes longer. In order to produce the Coanda effect, the angle of the center axis of the blown off clean air to the outer surfaces of the photo masks is set to be 65 degrees or less, and preferably 55 degrees or less.

After the exposure is completed, the vacuum-contact frames 13 and 14 are opened to cancel the vacuum contact by means of the drive mechanism 9 so that the photo masks 11 and 12 are separated individually from the opposite surfaces of the thin metallic belt 15, as shown in FIG. 2. Thereafter, the metallic belt 15 is run so that its exposed portions are driven out of the exposure apparatus through the space between the vacuum-contact frames 13 and 14.

When the vacuum contact is canceled to separate the photo masks 11 and 12 from the thin metallic belt 15 as this is done, substantial separation charge is caused, and the surrounding atmosphere flows into the region between the photo masks 11 and 12. If the atmosphere contains any foreign substances, the substances easily adhere to the masks 11 and 12 and the metallic belt 15.

By continuously activating the clean air supplier 31, however, the ionized clean air is caused to flow at a stroke into the region between the photo masks 11 and 12 through the first discharge port 34 when the vacuum-contact frames 13 and 14 are opened, thereby de-electrifying the photo masks and the metallic belt 15. At the same time, the clean air forms the clean curtains, thereby preventing foreign substances from externally getting into the region between the masks 11 and 12.

As the exposed portions of the thin metallic belt 15 are driven out of the vacuum-contact frames 13 and 14 so that unexposed portions of the belt are delivered into an exposure region or the region between the photo masks 11 and 12, moreover, foreign substances that adhere to the unexposed portions and are introduced into the exposure region can be de-electrified and removed by means of the ionized clean air. Electric charge that is produced by friction with air when the metallic belt 15 is moved can be also removed with ease.

In the clean air supplier 31, the wind speed of the clean air that flows over the respective outer surfaces of the photo masks 11 and 12 when the masks are moved to the exposure position is set at 4.7 m/sec or more, while the wind speed of the clean air that flows between the photo masks 11 and 12 when the masks are moved to the separate position is set at 2.7 m/sec or more. These wind speeds can be freely set by adjusting the rotational speed of the fans 42 or the like.

Although the delivery of the clean air from the first discharge port 34 is designed to be adjusted depending on whether the vacuum-contact frames 13 and 14 are open or closed, moreover, an adjusting mechanism for adjusting the delivery may be provided in the clean air supplier 31. In this case, the delivery from the first discharge port 34 can be freely adjusted by means of the adjusting mechanism.

The following is a description of an exposure apparatus according to a second embodiment of the invention.

Figure 4:
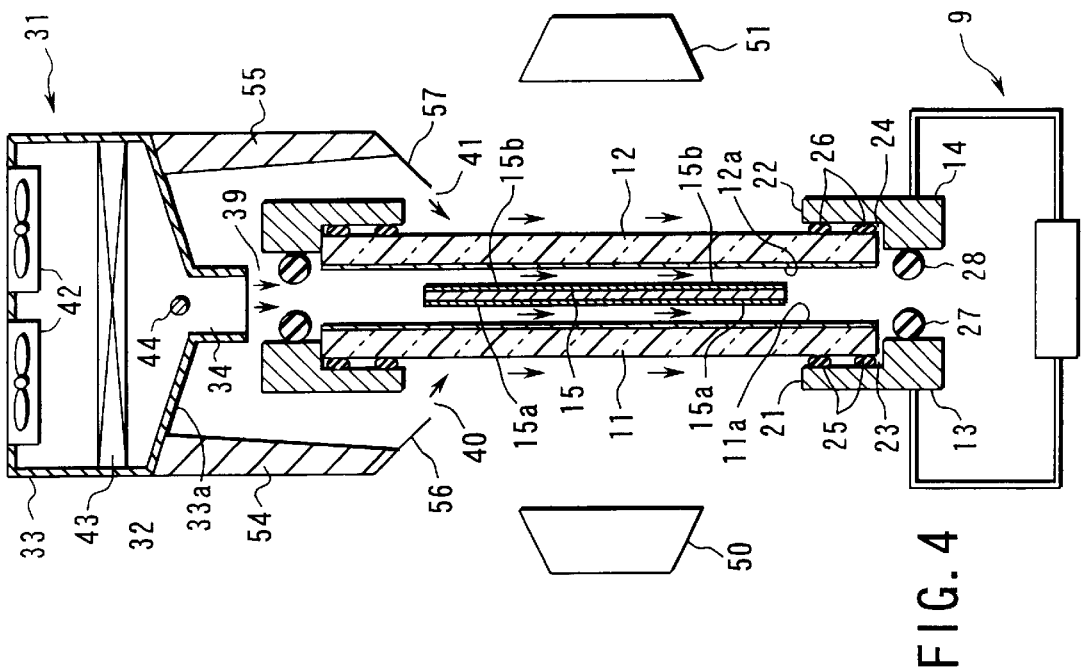
FIG. 4 is a longitudinal sectional view of the exposure apparatus of the second embodiment, illustrating an operating state of the apparatus with opened photo masks.
Figure 3:
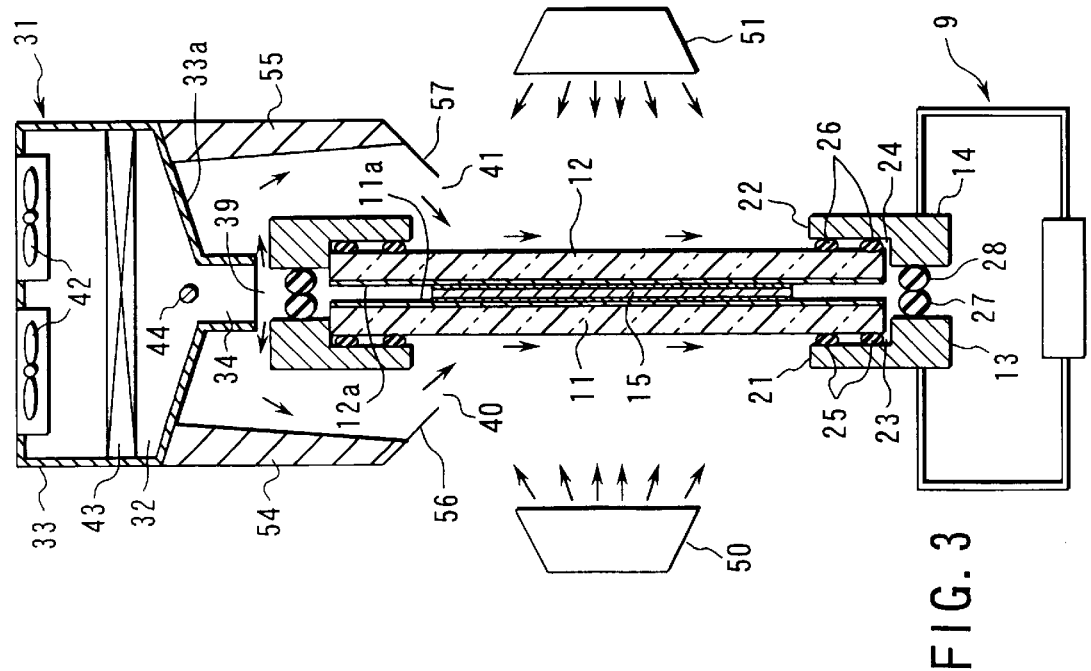
FIG. 3 is a longitudinal sectional view of an exposure apparatus according to a second embodiment of the invention, illustrating an operating state of the apparatus for exposure.

According to the second embodiment, as shown in FIGS. 3 and 4, a clean air supplier 31 is provided with a discharge port 34 in the central portion of a lower wall portion 33a of a body 33 and guide walls 54 and 55 that extend downward from the lower wall portion 33a to the outside of vacuum-contact frames 13 and 14, on either side of the discharge port 34. Further, the respective extending ends of the guide walls 54 and 55 are fitted with guide blades 56 and 57 that extend toward photo masks 11 and 12, respectively.

In the clean air supplier 31, the first discharge port 34 constitutes a first supply portion 39 that supplies clean air to the region between the photo masks 11 and 12, while the guide blades 56 and 57 constitute, respectively, second supply portions 40 and 41 that supply the clean air along the respective outer surfaces of the photo masks 11 and 12.

For other configurations, the second embodiment is arranged in the same manner as the first embodiment. In the description to follow, therefore, like reference numerals are used to like portions, and a detailed description of those portions is omitted.

According to the exposure apparatus constructed in this manner, as shown in FIG. 3, the vacuum-contact frames 13 and 14 are closed so that the photo masks 11 and 12 are brought into vacuum contact with the thin metallic belt 15 during exposure. In this state, resist layers 15a and 15b on the surface of the metallic belt 15 are exposed through the masks 11 and 12 by means of exposure light sources 50 and 51.

Although the clean air supplier 31 are actuated in this state, the ionized clean air discharged from the discharge port 34 is caused to flow sideways by the closed vacuum-contact frames 13 and 14 and is guided downward by means of the guide portions 54 and 55. Further, the clean air is redirected by means of the guide blades 56 and 57 and blown off toward the respective outer surfaces of the photo masks 11 and 12. Then, the air flows along the outer surfaces of the masks 11 and 12, thereby forming clean curtains and cooling the masks 11 and 12.

During exposure, the photo masks 11 and 12 are heated by means of heat rays (infrared components) that are generated from the exposure light sources 50 and 51, so that their temperature increases. As the clean air flows along the respective outer surfaces of the photo masks 11 and 12 to release heat from them, however, the temperature of the masks 11 and 12 can be prevented from increasing. A satisfactory cooling effect can be obtained by setting the respective angles of the guide blades 56 and 57 with respect to the photo masks 11 and 12 so that the Coanda effect is produced along the respective outer surfaces of the masks 11 and 12.

After the exposure is completed, the vacuum contact is canceled to open the vacuum-contact frames 13 and 14 so that the photo masks 11 and 12 are separated from the thin metallic belt 15, as shown in FIG. 4. Thereafter, exposed portions of the metallic belt 15 are driven out of the vacuum-contact frames 13 and 14.

Since the vacuum-contact frames 13 and 14 are opened to leave a gap between them as this is done, the ionized clean air flows at a stroke into the region between the photo masks 11 and 12 through the discharge port 34 of the clean air supplier 31. Thus, the clean air removes dust and forms clean curtains that serve to prevent foreign substances from getting into the region between the photo masks 11 and 12 from the outside. As new unexposed portions of the thin metallic belt 15 are delivered into the region between the photo masks 11 and 12, moreover, those foreign substances which adhere to the unexposed portions and are carried over into an exposure process are de-electrified and removed by means of the clean air. At the same time, electric charge that is produced by friction with air when the metallic belt 15 is moved can be also removed with ease.

According to the exposure apparatuses of the first and second embodiments constructed in this manner, foreign substances can be prevented from getting into the region between the photo masks 11 and 12, which can be moved toward and away from the thin metallic belt 15, or from adhering to the belt 15 or the photo masks by supplying the clean air from the clean air supplier 31 to the region between the photo masks. Thus, the resist layers can be accurately formed without the possibility of formation of defective apertures in the exposure region or development of stains thereon, which is attributable to damage to the photo masks 11 and 12, or partial breakage of the exposure patterns, or formation of unnecessary opaque portions in the photo masks. In consequence, shadow masks can be manufactured with good yield.

Further, the exposure apparatuses comprise the first supply portion 39 for supplying the clean air to the region between the photo masks 11 and 12 and the second supply portions 40 and 41 for supplying the clean air along the respective outer surfaces of the photo masks 11 and 12. During exposure, the clean air is supplied from the second supply portions 40 and 41 only. When the photo masks 11 and 12 are open, the clean air is supplied from both the first supply portions 39 and the second supply portions 40 and 41. Thus, a heat release effect for the photo masks can be obtained along with dust removing and de-electrifying effects.

As the clean air is supplied along the respective outer surfaces of the photo masks 11 and 12 during exposure, in particular, increase in temperature of the photo masks by heat from the exposure light sources 50 and 51 can be restrained. Consequently, dislocation that is attributable to thermal expansion of the photo masks can be reduced to facilitate high-accuracy exposure.

According to the exposure apparatuses described above, moreover, the delivery of the clean air from the first supply portion 39 can be automatically adjusted by opening or closing the photo masks 11 and 12. A satisfactory cooling effect can be obtained if the wind speed of the clean air that flows over the respective outer surfaces of the photo masks 11 and 12 that are in contact with each other is at 4.7 m/sec or more. Further, satisfactory dust removing and de-electrifying effects can be obtained if the wind speed of the clean air that flows between the photo masks 11 and 12 that are open is at 2.7 m/sec or more.

If the clean air is ionized by means of the ionizer 44, or more specifically, if it is ionized alternately for positive and negative charges, furthermore, foreign substances can be prevented from electrostatically adhering to the thin metallic belt 15 or the photo masks 11 and 12 during the exposure process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

According to the embodiments described herein, for example, the exposure apparatuses are applied to the cases of shadow masks of color cathode-ray tubes in which a to-be-exposed object is exposed simultaneously from both surface sides. Alternatively, however, the invention may be applied to exposure apparatuses, such as ones that are used in manufacturing processes for PDP's (plasma display panels), in which one photo mask and a substrate having a resist layer formed on only one of its surfaces are brought intimately into contact with each other as the substrate is exposed.

What is claimed is:

1. An exposure apparatus for exposing a to-be-exposed object, comprising:
    a mask support portion opposed to the to-be-exposed object, supporting a photo mask having an exposure pattern thereon, and configured to move the photo mask between an exposure position in which the photo mask is in contact with the to-be-exposed object and a separate position in which the photo mask is kept off the object;
    an exposure light source arranged to expose the to-be-exposed object through the photo mask in the exposure position; and
    a clean air supplier configured to run clean air between the to-be-exposed object and the photo mask when the photo mask is moved to the separate position.

2. An exposure apparatus according to claim 1, wherein the clean air supplier includes a first supply portion configured to supply the clean air to the region between the to-be-exposed object and the photo mask when the photo mask is moved to the separate position and a second supply portion configured to supply the clean air to the outer surface of the photo mask when the photo mask is moved to the separate position and when the photo mask is moved to the exposure position.

3. An exposure apparatus according to claim 2, wherein the clean air supplier includes adjusting means for adjusting the supply of the clean air from the first supply portion depending on the movement of the photo mask.

4. An exposure apparatus according to claim 2, wherein the clean air supplier includes a body, located adjacent to the mask support portion and an end portion of the photo mask and having a blast space therein, and an air inlet in the body through which gas is introduced into the blast space, the first supply portion has a first discharge port formed in the body, opening into the blast space, and located close to and opposite the end portion of the photo mask, and the second supply portion includes a nozzle extending from the body and having a second discharge port directed to the outer surface of the photo mask.

5. An exposure apparatus according to claim 2, wherein the clean air supplier includes a body, located adjacent to the mask support portion and an end portion of the photo mask and having a blast space therein, and an air inlet in the body through which gas is introduced into the blast space, the first supply portion has a discharge port formed in the body, opening into the blast space, and located adjacent to and opposite the end portion of the photo mask, and the second supply portion includes a guide portion extending from the body toward the outer surface of the photo mask and configured to guide the clean air discharged from the discharge port to the outer surface of the photo mask.

6. An exposure apparatus according to claim 2, wherein the wind speed of the clean air flowing over the outer surface of the photo mask in the separate position is at 4.7 m/sec or more, and the wind speed of the clean air flowing between the to-be-exposed object and the photo mask in the exposure position is at 2.7 m/sec or more.

7. An exposure apparatus according to claim 1, wherein the clean air supplier includes ionization means for ionizing the clean air.

8. An exposure apparatus according to claim 5, wherein the ionization means includes an alternating ionizer for ionizing the clean air alternately for positive and negative charges.

9. An exposure apparatus for exposing a to-be-exposed object having two opposite surfaces, comprising:
    mask support portions opposed individually to the surfaces of the to-be-exposed object, supporting photo masks each having an exposure pattern thereon, and configured to move the photo masks between an exposure position in which the photo masks are in contact with the corresponding surfaces of the to-be-exposed object and a separate position in which the photo masks are kept off the object;
    a pair of exposure light sources arranged to expose the surfaces of the to-be-exposed object through the photo masks in the exposure position; and
    a clean air supplier configured to run clean air between the to-be-exposed object and the photo masks when the photo masks are moved to the separate position.

10. An exposure apparatus according to claim 9, wherein the clean air supplier includes a first supply portion configured to supply the clean air to the regions between the to-be-exposed object and the photo masks when the photo masks are moved to the separate position and second and third supply portions configured to supply the clean air to the respective outer surfaces of the photo masks when the photo masks are moved to the separate position and when the photo masks are moved to the exposure position.

11. An exposure apparatus according to claim 10, wherein the clean air supplier includes adjusting means for adjusting the supply of the clean air from the first supply portion depending on the movement of the photo masks.

12. An exposure apparatus according to claim 10, wherein the clean air supplier includes a body, located adjacent to the mask support portions and the respective end portions of the photo masks and having a blast space therein, and an air inlet in the body through which gas is introduced into the blast space, the first supply portion has a first discharge port formed in the body, opening into the blast space, and located close to and opposite the end portions of the photo masks, the second supply portion includes a nozzle extending from the body and having a second discharge port directed to the outer surface of one of the photo masks, and third supply portion includes a nozzle extending from the body and having a third discharge port directed to the outer surface of the other photo mask.

13. An exposure apparatus according to claim 10, wherein the clean air supplier includes a body, located adjacent to the mask support portions and the respective end portions of the photo masks and having a blast space therein, and an air inlet in the body through which gas is introduced into the blast space, the first supply portion has a discharge port formed in the body, opening into the blast space, and located adjacent to and opposite the end portions of the photo masks, the second supply portion includes a guide portion extending from the body toward the outer surface of one of the photo masks and configured to guide the clean air discharged from the discharge port to the outer surface of the one photo mask, and the third supply portion includes a guide portion extending from the body toward the outer surface of the other photo mask and configured to guide the clean air discharged from the discharge port to the outer surface of the other photo mask.

* * * * *